Aug. 29, 1939.   L. H. WILLIAMS   2,171,054
APPARATUS FOR DISPLAYING AND ADVERTISING MERCHANDISE
Filed Nov. 16, 1938   2 Sheets-Sheet 1

INVENTOR
Louis H. Williams
BY
Fred G. Mathery
ATTORNEY

Aug. 29, 1939. L. H. WILLIAMS 2,171,054
APPARATUS FOR DISPLAYING AND ADVERTISING MERCHANDISE
Filed Nov. 16, 1938 2 Sheets-Sheet 2
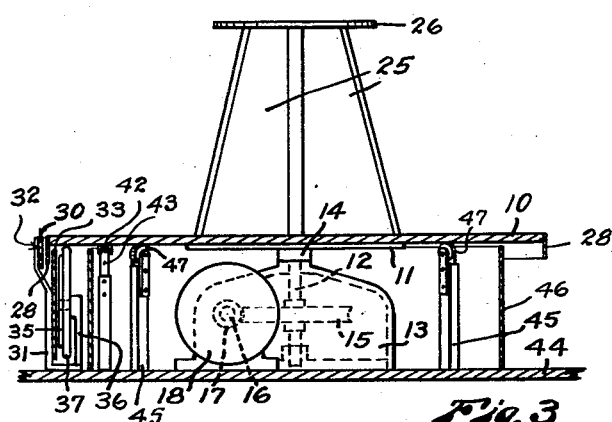
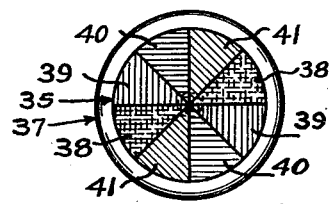
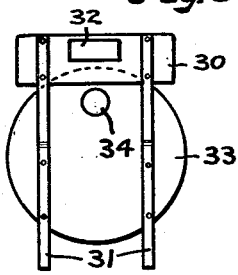
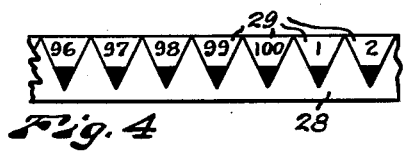
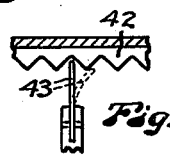
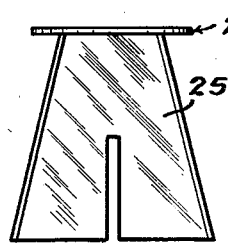
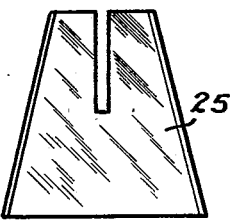
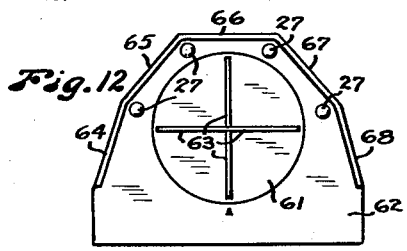
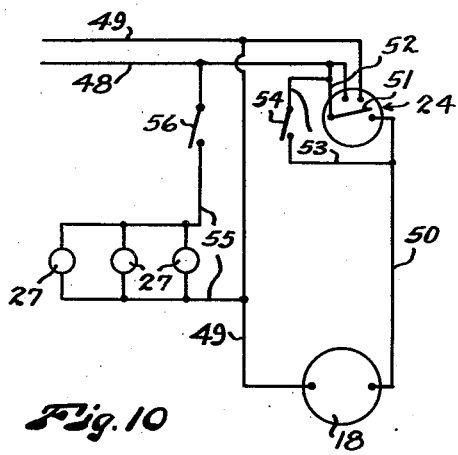
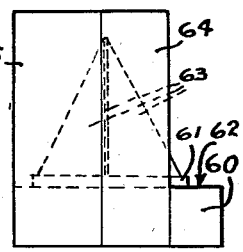
INVENTOR
Louis H. Williams
BY Fred C. Matheny
ATTORNEY Patented Aug. 29, 1939

2,171,054

UNITED STATES PATENT OFFICE 2,171,054

APPARATUS FOR DISPLAYING AND
ADVERTISING MERCHANDISE

Louis H. Williams, Seattle, Wash.

Application November 16, 1938, Serial No. 240,692

7 Claims. (Cl. 40—33)

This invention relates to apparatus for displaying and advertising merchandise and a primary object of this invention is to provide a merchandise display device which utilizes a plurality of mirrors in such a manner as to greatly multiply the number of images of articles displayed.

Another primary object of this invention is to provide movable merchandise display means in combination with a plurality of mirrors whereby the merchandise to be displayed will be moved continuously and the effect of this movement will be greatly increased and multiplied by the mirrors.

Another object is to provide a rotating merchandise display table combined with three mirrors in such a way as to produce a fascinating display of merchandise, the mirrors being positioned, one directly back of the rotating table and the other two in edge to edge relation to said back mirror and extending outwardly and forwardly therefrom at such an angle as to provide for a multiple reflection, between the several mirrors, of images of articles on the table thus giving a constantly changing view of all sides of the articles to be displayed and displaying each article on the table throughout the full three hundred sixty degrees of movement of the table.

Another object is to provide a rotating merchandise display table having a centrally positioned mirror structure thereon and rotatable therewith, said centrally positioned mirror structure cooperating with fixed mirrors back of the table to provide an attractive and pleasing display of goods.

Another object of the invention is to provide a rotary table having time controlled devices for stopping the same and having indicia means in connection therewith for indicating, at the time the table stops, a prize winning indicia or number which will correspond with an indicia or number on a sales slip held by a customer who has purchased goods of the type displayed.

Other objects are to provide merchandise display apparatus which is simple and inexpensive in construction, reliable and efficient in operation and which is ornamental in appearance and capable of attracting the attention of customers to merchandise displayed thereon.

Other and more specific objects of the invention will be apparent from the following description taken in connection with the accompanying drawings.

In the drawings

Fig. 3 is a sectional view through the table substantially on a broken line 3—3 of Fig. 2, parts being shown in elevation and other parts being broken away.

Fig. 4 is a detached fragmentary view on a larger scale than Figs. 1, 2 and 3 of the circumferential portion of the table having indicia thereon.

Fig. 5 is a detached elevation of a color disc.

Fig. 6 is a detached elevation of two plates with sight openings therein which are positioned at the front of the device.

Figs. 7 and 8 are elevations respectively of two parts of a mirrored tower member which is used in the center of the table showing said two parts dis-assembled.

Fig. 9 is a somewhat diagrammatic face view of a sales slip which may be used in connection with the invention.

Fig. 10 is a wiring diagram showing a clock controlled electric circuit for this device.

Fig. 11 is a detached view of devices used to influence the stopping of the table.

Figs. 12, 13 and 14 are small scale views in plan, front elevation and side elevation respectively of a device constructed in accordance with this invention.

Like reference numerals designate like parts throughout the several views.

Figure 1:
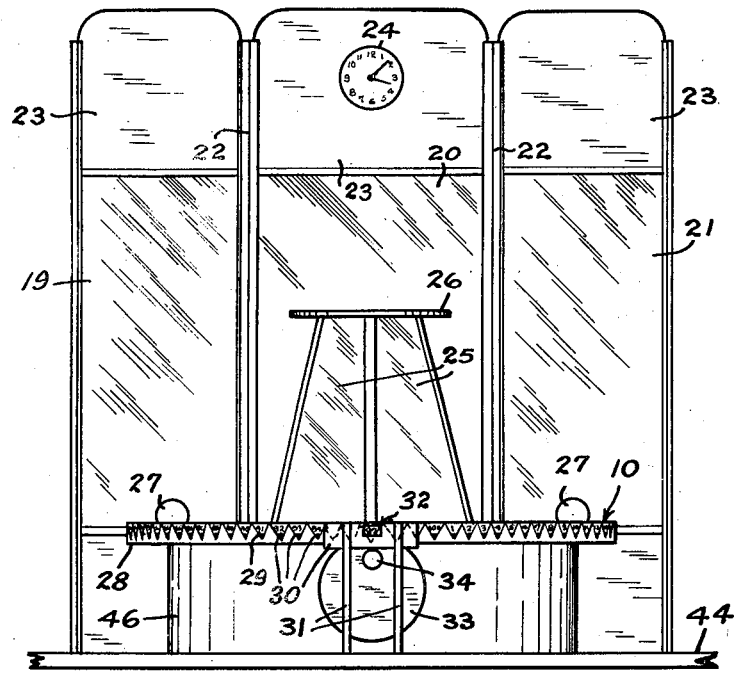
Fig. 1 is a front elevation of a merchandise display and advertising apparatus constructed in accordance with this invention.
Figure 2:
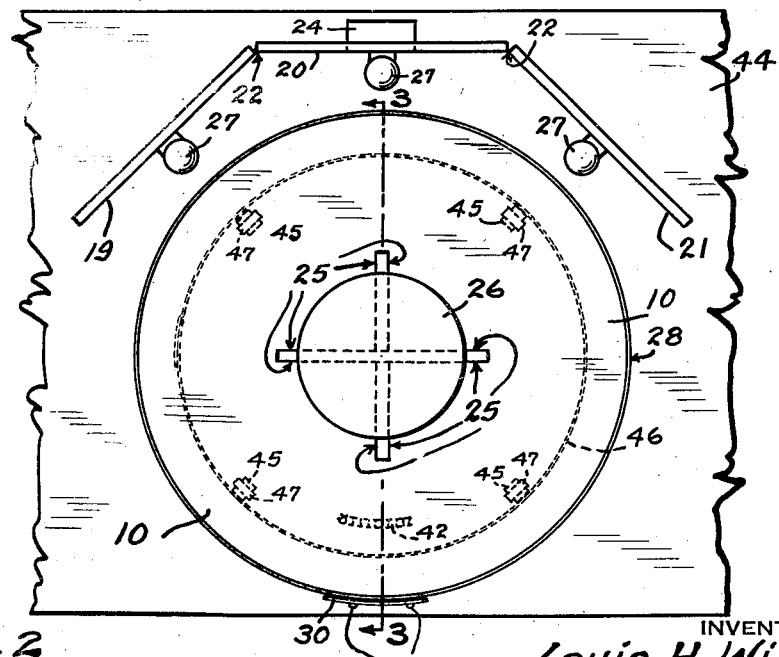
Fig. 2 is a plan view of the same.

In the drawings, 10 designates a table, preferably of circular shape. A bracket member 11, is secured to the bottom of the table 10 and provided with a shaft 12 which extends downwardly therefrom into a housing 13. Suitable thrust bearing means is provided to support the weight of the table 10 and load thereon. This thrust bearing may be provided by a hub 14 on the bracket 11, which hub has a bearing on the top portion of the housing 13. A worm wheel 15 is secured to the shaft 12 within the housing 13 and meshes with a worm 16 on the shaft 17 of an electric motor 18. This provides a slow speed drive for the table 10. Three mirrors 19, 20 and 21 hinged together along their edges 22 are positioned back of the table 10 in substantially the relation thereto shown in Fig. 2. Display spaces 23 for advertising matter are provided at the upper portions of the mirrors 19, 20 and 21 and a time controlled device 24 is preferably mounted on the upper portion of the upper display section 23 of the mirror member 20. This time controlled device is used to control the starting and stopping of the table as hereinafter set forth.

A mirrored tower structure is positioned in the central portion of the table 10. This mirrored tower structure is in the form of four double mirrors 25 positioned at angular intervals of ninety degrees and radiating from a common center. Preferably each mirror 25 tapers from bottom to top and preferably a disc 26 is positioned on the top of these mirrors 25. Preferably the two parts of which this mirrored tower section is formed are each slotted throughout substantially one half of their length, as shown in Figs. 7 and 8 so that they are quickly and easily assembled or dis-assembled and are flat and compact when dis-assembled.

Electric lamps 27 are preferably provided in the lower portions of the mirrors 19, 20, 21 to provide desirable illumination.

The peripheral portion of the table 10 has a downwardly extending flange 28 which is provided with a plurality of distinguishing marks 29 preferably of diamond shape with the points thereof directed downwardly. A number or other distinguishing character is provided within each diamond shaped mark 29. A plate 30 is supported in front of the flange 28 by bars 31 and a sight opening 32 is provided in the plate 30 just large enough to allow one of the numbers on said flange 28 to be easily seen and read through this opening. A stationary plate 33 is also supported by the bars 31, inwardly from the plate 30 and a sight opening 34 is provided in the plate 33 below the sight opening 32. Obviously the plates 30 and 33 can be one piece. Positioned just inside of the plate 33 is a wheel member 35 mounted for rotation on a fixed support 36 and having a rubber tire portion 37 positioned to engage with the bottom portion of the table in such a manner that the wheel member 35 will be rotated by movement of the table. The face of the wheel member 35 is divided into a plurality of segments of different colors as shown in Fig. 5 and one of these colors will show through the sight opening 34 in the plate 33 when the table is not rotating. This makes it possible to establish a combination between the colors on the wheel member 35 and the numbers on the periphery of the table 10. For instance, if in a drawing for merchandise, the number "97" is visible through the sight opening 32 and the color red is visible through the sight opening 34 when the table 10 comes to rest this may indicate that a person holding a red sales slip or ticket number "97" is the winner of the merchandise. With a rotating table 10 of a given size there is a limit to the number of marks or numbers that can be displayed on the periphery thereof in large enough size to be clearly readable to persons at a distance of several feet from the table. I find that for a circular merchandise display table of from thirty to thirty six inches in diameter one hundred clearly marked numbers can be placed on the periphery of the table so as to be easily readable. This would mean that only one hundred sales slips or tickets could be given out to customers, without duplication, for a drawing of merchandise in which the winning number is determined by the stopping of the table. This number of sales slips which may be given out without duplication is increased by one hundred by the use of each additional color. The color wheel shown in Fig. 5, is divided into eight segments and four colors are used, with corresponding colors on each two diametrically opposite segments, the colors gold, red, black and green being indicated by conventional line shading on the respective segments by 38, 39, 40 and 41. Thus if a color wheel of four colors is used in combination with sales slips designating four colors it is possible to give out without duplication and for one drawing of merchandise four times as many sales slips as there are numbers on the periphery of the table. Obviously different numbers of segments may be provided on the color wheels and a different color may be provided on each segment if desired. One type of ticket or sales slip which may be used is shown in Fig. 9, wherein is illustrated a red ticket bearing the number "97".

To prevent the table from stopping midway between two numbers and to insure that said table will always stop with one of the numbers on the flange 30 in correct alignment with the sight opening 32, I provide on the bottom of said table a serrated or saw toothed circular track 42, Figs. 3 and 11, that is engaged by a resident finger member 43 preferably of rubber. This finger 43 will not make it possible to predetermine the point at which the table will stop but will exert just enough pressure on the track 42 to always bring the table 10 to a stop with a number on the periphery thereof in substantially correct registration with the sight opening 32 in the plate 30. The color disc 35 will be synchronized with the table 10 so that it will always stop with one color in registration with the sight opening 34 and will not stop with two colors showing through said sight opening.

The motor 18 and housing 13 rest on a support 44. A plurality of posts 45 extend upwardly from the support 44 and a flexible housing member 46 is preferably drawn around these posts and encloses the motor 18 and housing 13. A roller 47 is provided on the top of each post 45 for engagement with the bottom of the table so that in the event the table is overloaded on one side and there is a tendency to tilt the table said table will engage with and roll upon the rollers 47 and this tilting movement will be limited. Also bending strains on the shaft 12 will be minimized by rollers 47.

In Fig. 10 I have shown diagrammatically the circuits connected with the time controlled device, the motor 18 and the lamps 27. In this diagram 48 and 49 are energized circuit wires. The time controlled device 24 is preferably electrically operated and the circuit wires 48 and 49 are connected therewith for operating the same. One circuit wire 49 is connected with one side of motor 18. The other side of motor 18 is connected by conductor 50 with one terminal of a switch 51. The switch 51 is controlled by the clock 24. The other terminal of switch 51 is connected by conductor 52 with the circuit wire 48. A shunt circuit 53 having a manually controlled switch 54 therein is shunted around clock controlled switch 51 and connects conductors 48 and 49. Conductor means 55 connects lamps 27 with circuit wires 48 and 49 and has an independent switch 56 therein. Clock 24 may be merely a time operated switch. However I prefer that it shall be a type of clock which will indicate the correct time on the face thereof, and in addition, be capable of opening the switch 51 at any predetermined set time. When switch 54 is closed the motor 18 will be energized and the table 10 rotated irrespective of the position of switch 51. When the clock is to control the motor circuit for stopping the table at a predetermined time the switch 51 is closed, the clock is set to open said switch 51 at the predetermined time and the switch 54 is opened. Current to motor 18 is then supplied through switch 51 and the circuit will be broken and the table stopped when the clock opens this switch 51. It is impossible for the person who sets the clock for the purpose of stopping the table at a predetermined time to know what number and what color will be visible when the table is stopped.

In the use of this device the device is preferably placed in a store window and merchandise to be displayed is placed on the table 10. The switch 54 is closed to supply current to the motor 18 and rotate the table. At a proper interval of time before the table is to be stopped the clock 24 is adjusted to close the switch 51 and set the clock to open said switch at the predetermined time. The switch 54 is then opened and the table allowed to rotate until the clock opens the switch 51 and breaks the motor circuit to stop the table. While the table is rotating it provides motion calculated to arrest the attention and arouse the interest of prospective customers. Also the images of the displayed merchandise are multiplied many times by the mirrors. Merchandise may also be advertised in the display spaces 23 and an announcement may be placed in one of these spaces to the effect that holders of sales slips representing sales of merchandise of the store will be entitled to participate in a drawing of premium merchandise when the table stops. When the table stops one of the members on the periphery thereof will be visible through the sight opening 32 and one of the colors on the color disc 35 will be visible through the sight opening 34 and the customer holding the sales slip or ticket corresponding to this number and color will be the winner of the premium merchandise.

The device thus provides a very attractive and interesting display of merchandise and makes a large merchandise display with a small amount of merchandise and also arouses the interest of customers in the merchandise displayed and stimulates the purchase of goods because of the chance determining features of the rotary merchandise display table.

In Figs. 12, 13 and 14 I have shown a modified form of the invention in which all of the parts are built into a single unitary one piece display device of a construction similar to the construction of the device illustrated in Figs. 1 to 11. The device shown in Figs. 12, 13 and 14, comprises a box like base portion 60 within which is driving mechanism, not shown, similar to that disclosed in Fig. 3, and connected with a turntable 61 that projects above the plane of the top 62 of the base 60. A mirrored tower structure comprising four triangular plates 63 positioned at angular intervals of substantially ninety degrees and tapering to a point at the top is positioned on the turntable 61. The triangular plates 63 are mirrored on both sides. Five upright mirrors 64, 65, 66, 67 and 68 are disposed at obtuse angles relative to each other with the mirror 66 directly back of the turntable 61, the mirrors 64 and 65 on one side of the turntable 61 and the mirrors 67 and 68 on the other side of the turntable 61 substantially as shown. When thus positioned the five mirrors 64—68 provide a greater number of reflected images of merchandise on turntable 61 than are provided by the three mirrors in Figs. 1 and 2. Also the mirrored tower structure formed by plates 63 terminates in a point and obstructs the view less than does the tower structure shown in Figs. 1 and 2. Lamps 27, preferably four in number, are positioned just above the top 62 of the base portion 60 in the angles formed by the intersecting mirrors 64 to 68 inclusive. When positioned in these angles the lamps will not only illuminate the display to the best advantage but each lamp will be mirrored to the best advantage by the two adjacent mirrors.

Preferably numbers, not shown, are provided on the circumference of the turntable 61 and pointer means and clock controlled stop means are provided in connection with the device shown in Figs. 12, 13 and 14 all as fully described in connection with the devices shown in Figs. 1 to 11 inclusive.

The foregoing description and accompanying drawings clearly disclose a preferred embodiment of my invention but it will be understood that this disclosure is merely illustrative and that changes may be made within the scope and spirit of the appended claims.

I claim:

1. Apparatus of the class described for displaying and advertising merchandise comprising a rotary table; a plurality of mirrors positioned at the rear of said table; and a mirrored tower structure extending upwardly from the central portion of said table.

2. Apparatus for displaying and advertising merchandise comprising a rotary table; a mirror positioned at the rear of said table in close proximity thereto; two other mirrors positioned edge to edge with said first named mirror and extending forwardly and outwardly at an obtuse angle relative to said first named mirror and alongside of said table; and a mirrored tower structure extending upwardly from the central portion of said table.

3. Apparatus for displaying and advertising merchandise comprising a horizontal rotary table; a mirror positioned at the rear of said table in close proximity thereto; two other mirrors positioned edge to edge with said first named mirror and extending forwardly and outwardly at an obtuse angle relative to said first named mirror; and merchandise advertising panels provided in the upper portions of said mirrors.

4. Apparatus for displaying and advertising merchandise comprising a rotary table; a plurality of mirrors positioned at the rear of said table; and a mirrored tower structure extending upwardly from the central portion of said table, said mirrored tower structure comprising four plane members mirrored on both sides and radiating at angles of substantially ninety degrees from a common center.

5. Apparatus for displaying and advertising merchandise comprising a rotary table; driving means connected with said table; a plurality of mirrors positioned at the rear of said table; and a mirrored tower structure extending upwardly from the central portion of said table, said mirrored tower structure comprising four plane members mirrored on both sides and radiating at angles of substantially ninety degrees from a common center, said tower mirrors being tapered from bottom to top to provide a narrower top portion and said tower mirrors having a shelf on the top portion thereof.

6. Apparatus for displaying and advertising merchandise comprising a rotary table; an electric motor having a driving connection with said table; indicia on the peripheral portion of said table; plate means positioned to obscure a portion of the periphery of said table and having a sight opening through which one of the indicia on the periphery of said table is always visible when the table is at rest; a color disc connected with said table and rotatable by rotary movement of said table, said color disc having a plurality of differently colored areas thereon; and indicator means positioned to indicate visually one of the colors on said color disc when the color disc is at rest, whereby the indicated color and indicia may be used jointly to determine the winner of a premium.

7. In a combined merchandise display and chance determining table of the class described, a rotary table member; a plurality of indicia on the periphery of said table; indicator means positioned to designate one of said indicia when the table is stopped; a color disc; a wheel secured to said color disc and contacting the table for rotating the disc when the table is rotated; and indicator means positioned to designate a color on said disc when the table and disc are stopped.

LOUIS H. WILLIAMS.